United States Patent [19]

Watanabe

[11] Patent Number: 4,487,287
[45] Date of Patent: Dec. 11, 1984

[54] SUPPORT SYSTEM FOR AUTOMOBILE POWER PLANT

[75] Inventor: Kenichi Watanabe, Hiroshima, Japan
[73] Assignee: Mazda Motor Corporation, Hiroshima, Japan
[21] Appl. No.: 402,577
[22] Filed: Jul. 28, 1982
[30] Foreign Application Priority Data Aug. 3, 1981 [JP] Japan .................. 56-122197
Aug. 3, 1981 [JP] Japan .................. 56-122198
Aug. 3, 1981 [JP] Japan .................. 56-122199

[51] Int. Cl.³ .................................................. B60K 5/04
[52] U.S. Cl. ..................................... 180/297; 248/605
[58] Field of Search .............. 180/291, 297, 300, 312; 248/603, 605

[56] References Cited

U.S. PATENT DOCUMENTS 3,326,501  6/1967  Cauvin ........................... 180/297 X
4,240,517  12/1980  Harlow, Jr. et al. ............. 180/300 X
4,271,920  6/1981  Barthelemy ...................... 180/297 X
4,300,649  11/1981  Sakata ............................ 180/297 X

FOREIGN PATENT DOCUMENTS 2915632  10/1979  Fed. Rep. of Germany ...... 180/297
54-5233  1/1979  Japan .

Primary Examiner—Joseph F. Peters, Jr.
Assistant Examiner—Michael Mar
Attorney, Agent, or Firm—Burns, Doane, Swecker and Mathis

[57] ABSTRACT

A support system for elastically yieldingly supporting an automobile power plant having a transversely mounted engine comprises at least first, second and third elastically yieldable bearing assemblies which are used to connect elastically yieldably different portions of the power plant to different portions of an engine compartment defining structure. While the first and second bearing assemblies support the power plant from lateral directions, the third bearing assembly supports the power plant from below and, for this purpose, the third bearing assembly is interposed between the power plant and a cross member extending widthwise of the automobile.

7 Claims, 4 Drawing Figures

SUPPORT SYSTEM FOR AUTOMOBILE POWER PLANT

BACKGROUND OF THE INVENTION

The present invention generally relates to a support system for an automobile power plant and, more particularly, to a support system for supporting an automobile power plant in an engine compartment of the automobile body structure.

It is generally well known that, in an automobile of either a front engine, front wheel drive type or a rear engine, rear wheel drive type, an automobile power plant including an engine, a transmission and a differential gear box is housed in an engine compartment with the axis of rotation of at least the engine extending widthwise of the automobile body structure. As compared with the longitudinal mounting arrangement of the automobile power plant in which the engine is mounted with its axis of rotation extending longitudinally of the body structure, this transverse mounting arrangement is susceptible to a relatively large rolling motion due to abrupt change in torque and/or the traction force resisting against the road resistance. In view of this, a torque rod, i.e., a roll stopper, has been employed to connect the top of the power plant to a partition wall separating the engine room from the passenger compartment, which partition wall may be constituted by a dashboard panel. This torque rod having one end connected to the power plant has the other end connected at right angles to the partition wall and, therefore, not only does it tend to exhibit insufficient strength, but also vibrations of the power plant tend to be readily and markedly transmitted to the passenger compartment thereby constituting one of the major causes of noises.

The Japanese Laid-open Utility Model Publication No. 54-5233, laid open to public inspection on Jan. 13, 1979, discloses a solution to the problem inherent in the employment of the torque rod discussed above. According to this prior art publication, the automobile power plant is supported at three points including first and second points of connection, each located between one respective end of the power plant and a respective side wall defining the associated tire housing and above the center of gravity of the power plant, and a third point of connection for the support of the power plant from below and located immediately below the center of gravity of the power plant as a whole. These points of connection are so positioned and so arranged that the nter of gravity of the power plant inclusive of the engine, the transmission and the differential gear box substantially lies on and within the triangular plane defined by these points of connection, i.e., on and within the plane of triangular shape whose apexes are respectively occupied by the first to third points of connection.

Each of the first and second points of connection is defined by a respective elastically yieldable bearing structure disclosed as comprised of a generally U-shaped bracket secured to the respective side wall, and an elastic member carried by the bracket and connected to the power plant through a rigid tubular member, whereas the third point of connection is defined by a third elastically yieldable bearing structure disclosed as comprised of elastic members which are secured to the power plant through a bracket and a sub-frame through another bracket.

The prior art three-point support system is described as effective to minimize the rolling motion of the power plant without relaying on the use of such a torque rod as hereinbefore discussed. However, since it is essential for the third point of connection to be located immediately below the center of gravity of the power plant and the third elastic bearing structure is, therefore, responsible for the support of a majority of the entire weight of the power plant, the sub-frame has become necessitated. Although the above mentioned publication is silent as to the nature of the sub-frame and how it is associated with the automobile body structure, the sub-frame is shown as having a generally inverted U-shaped cross-section as viewed in a direction at right angles to the axis of rotation of the transversely mounted engine, i.e., in a direction longitudinally of the automobile, and accordingly, it appears reasonable to conclude that the sub-frame extends longitudinally of the automobile beneath the power plant and terminates in connected relation to the partition wall between the engine compartment and the passenger compartment. So far as the sub-frame is connected to the partition wall, i.e., the dashboard panel, vibrations generated from the power plant when in operation are after all transmitted through the sub-frame to the passenger compartment.

SUMMARY OF THE INVENTION

The present invention has been developed with a view to substantially eliminating the above described disadvantages and inconveniences inherent in the prior art support system for the automobile power plant and has for its essential object to provide an improved support capable of elastically yieldingly supporting the power plant with effective counter-measures being taken to minimize both the rolling motion of the power plant and the transmission of vibrations from the power plant to the automobile interior.

Another object of the present invention is to provide an improved support system of the type referred to above, which is effective to minimize any possible angular displacement of the power plant, which displacement is generally referred to as a "yawing" of the power plant.

A further object of the present invention is to provide an improved support system of the type referred to above, which is effective to provide a relatively wide range of accessibility to component parts of the power plant.

In order to accomplish these and other objects, the present invention is applied to the automobile power plant including an engine, a transmission and a differential gear box and housed within the engine compartment of an automobile body structure with the axis of rotation of the engine oriented widthwise of the body structure or, speaking differently, transversely of the direction of run of the automobile, which engine compartment is defined by at least a partition wall separating the engine compartment from the passengers' compartment and a pair of opposite side walls extending generally transversely of the partition wall in spaced relation to each other.

The support system according to the present invention comprises at least first, second and third bearing assemblies which are used to elastically yieldingly connect different portions of the power plant to the side walls and a cross member extending transversely between respective ends of the side walls in spaced relation to the partition wall. As is the case with the previously mentioned prior art publication, these bearing assemblies are so positioned as to form a triangular plane having its apexes occupied by the respective points of elastically yieldable connection defined by the bearing assemblies, the positions of said bearing assemblies being so selected as to permit the triangular plane to generally contain the center of gravity of the power plant or to permit the center of gravity of the power plant to be located in the close vicinity of the triangular plane.

In a preferred embodiment of the present invention, in order to minimize the transmission of vibrations from the power plant to the partition and side walls as much as possible by causing the associated bearing assemblies to subdue it, these bearing assemblies are so positioned that the imaginary line passing through the first and second points of elastically yieldable connection defined by the respective first and second bearing assemblies can extend above the center of gravity of the power plant and generally in parallel to the natural torque axis of the power plant, as will be defined later, while one of the first and second bearing assemblies is located at a level substantially intermediately between the respective levels of the other of the first and second bearing assemblies and the third bearing assembly located below and on one side of the center of gravity of the power plant opposite to the imaginary line.

In another preferred embodiment of the present invention, each of the first to third bearing assemblies includes an inner sleeve, an outer sleeve positioned coaxially externally of the inner sleeve, and an elastic cushion member positioned between the sleeves. In order to absorb the yawing of the power plant when the power plant in operation tends to yaw, the first to third bearing assemblies are so designed and so positioned as to permit the axis of each of the inner sleeves to extend in a direction generally tangential to the imaginary circle having its center through which the yaw axis, i.e., the axis about which the power plant tends to yaw, extends in contrast to the teachings of the previously mentioned publication which discloses the pivot shafts of the first and second bearing structures shown as extending vertically and generally transversely of the axis of rotation of the engine.

BRIEF DESCRIPTION OF THE DRAWINGS

These and other objects and features of the present invention will become readily understood from the following detailed description thereof taken in conjunction with a preferred embodiment thereof with reference to the accompanying drawings, in which.

DETAILED DESCRIPTION OF THE INVENTION

Figure 1:
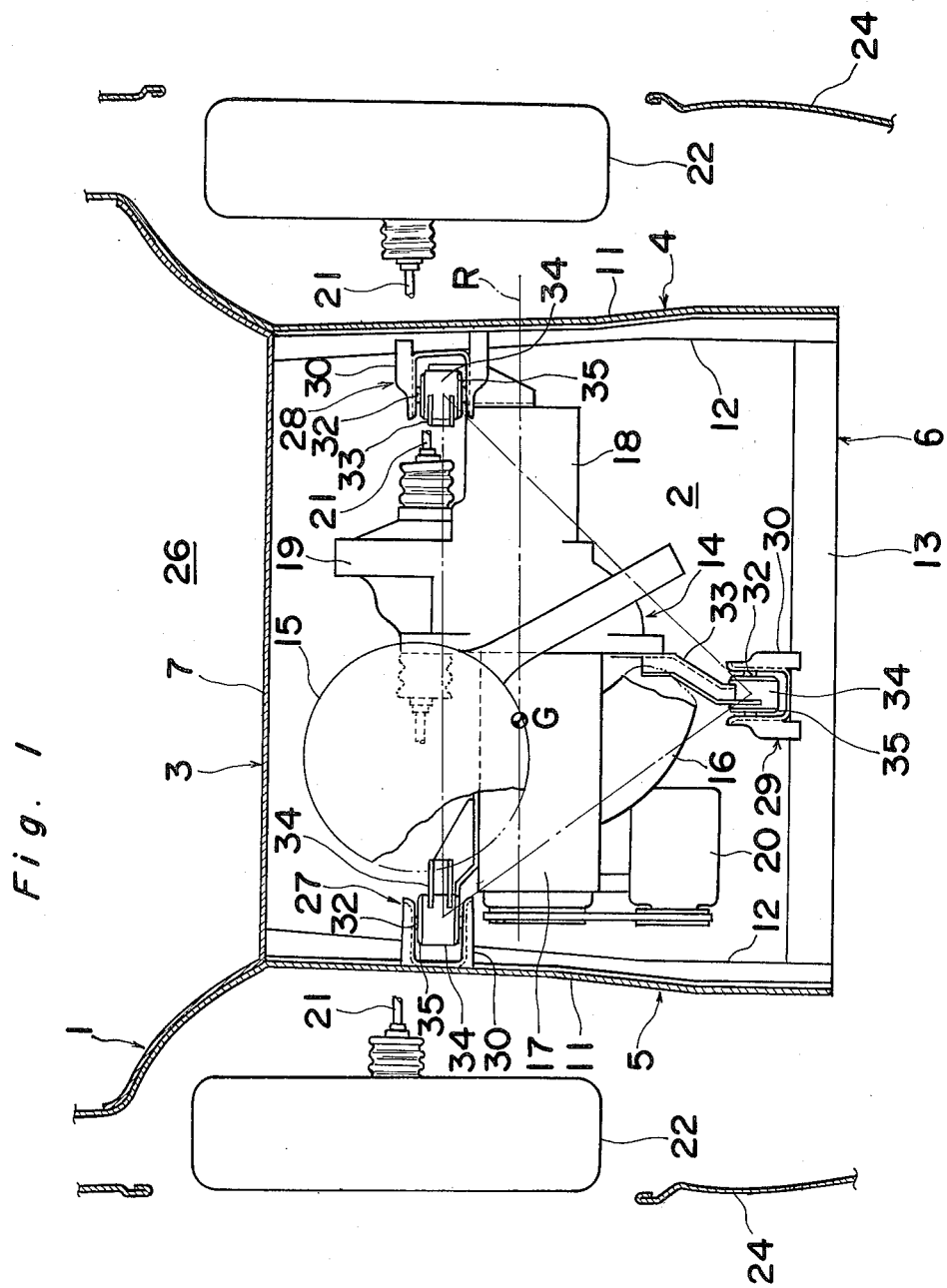
FIG. 1 is a top plan view of an automobile power plant housed in a front engine compartment with a portion of the automobile body structure shown in section.

Before the description of the present invention proceeds, it is to be noted that like parts are designated by line reference numerals throughout the accompanying drawings. It is also to be noted that the present invention will be described as applied to an automobile of front engine, front wheel drive type for the purpose of illustration, although it may equally apply to the automobile of rear engine, rear wheel drive type.

Figure 2:
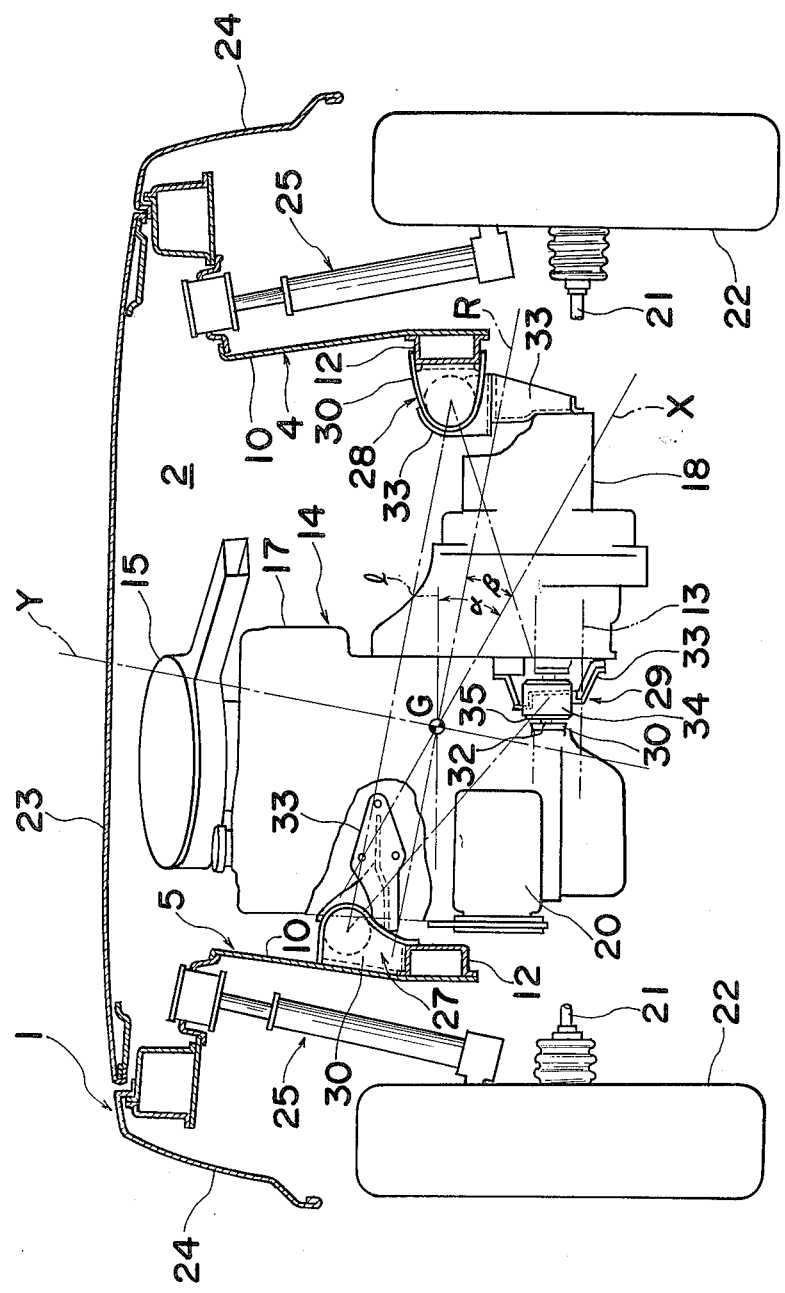
FIG. 2 is a front elevational view of the power plant shown in FIG. 1.
Figure 3:
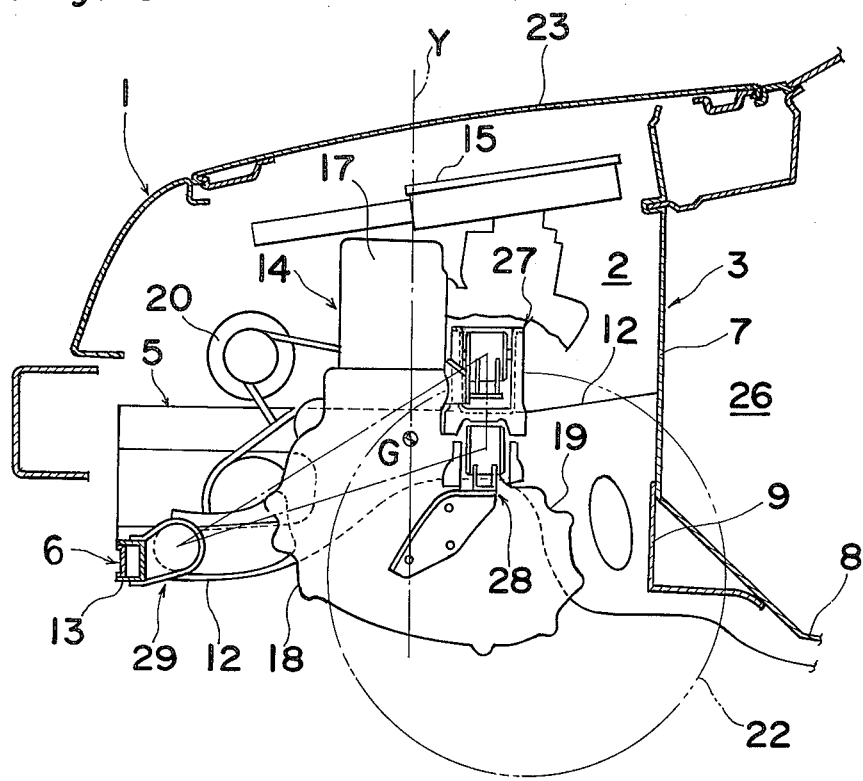
FIG. 3 is a side elevational view of the power plant shown in FIG. 1.

Referring to FIGS. 1 to 3, an automobile front body structure 1 has an engine compartment 2 defined therein by a partition wall 3, which separates the engine compartment from the passenger compartment 26 (FIGS. 1 and 3), a pair of opposite side walls 4 and 5 protruding from the opposite sides of the partition wall 3 in a direction frontwardly of the automobile, and a front frame 6 which extends generally in parallel to and in spaced relation to the partition wall 3 with its opposite ends secured to the side walls 4 and 5. The partition wall 3 so far shown is constituted by a dashboard panel 7, a floor panel 8 continued from a lower edge of the dashboard panel 7 and extending rearwardly of the automobile and in a direction away from the engine compartment 2, and an angle member 9 secured to the panels 7 and 8 for the purpose of reinforcing the joint between the panels 7 and 8.

Each of the side walls 4 and 5 so far shown is constituted by a respective suspension tower 10 for housing a corresponding wheel suspension assembly 25 and a respective wheel apron 11. Each of these side walls 4 and 5 includes a generally U-sectioned side frame member 12 extending lengthwise of the automobile and secured to the inner surface of the respective wheel apron 11 so as to define a closed rectangular-sectioned hollow therein.

The front frame 6 is secured to the front ends of the side frame members 12 and constituted by an elongated cross member 13 of generally closed cross-section. The front frame 6 thus formed defines the engine compartment 2 at the front end portion of the body 1.

It is to be noted that the engine compartment 2 has an access opening at the top of the front body structure 1, which access opening is adapted to be selectively opened and closed by a hingedly supported bonnet 23. Reference numerals 21 and 22 represent left-hand and right-hand drive shafts and left-hand and right-hand front wheels, respectively. Reference numeral 24 represents front fender panels.

A power plant 14 is housed within the engine compartment 2 and is supported in a manner as will be described later. This power plant 14 comprises an in-line multicylinder engine 17 equipped with an air cleaner 15 and an exhaust manifold 16 so far shown, a transmission unit 18 coupled in line with the power output shaft (not shown) of the engine 17, a differential gear unit 19 positioned laterally of the transmission unit 18 and having a differential gear system (not shown) operatively coupled in any known manner to the drive shafts 21, an alternator 20 carried by the engine 17 and positioned on one side of the engine 17 opposite to the differential gear unit 19, and a compressor unit (not shown) for an air-conditioning system. For the purpose of the present invention, the power plant 14 comprising such components as hereinabove described may be regarded as a single unitary structure supported by a three-point support system according to the present invention.

So far shown, the power plant 14 is housed within the engine compartment 2 in such a manner that the axis of rotation of the engine, i.e., a crank shaft, is oriented widthwise of the automobile with the engine 17 and the transmission unit 18 occupying respective portions of the compartment 2 adjacent the side walls 5 and 4 and also with the longitudinal axis of the engine cylinder oriented vertically.

In accordance with a feature of the present invention, the support system for the support of the power plant 14 within the engine compartment 2 comprises, so far shown, a first elastically yieldable bearing assembly 27 interposed between the engine 17 and the side wall 5, a second elastically yieldable bearing assembly 28 interposed between the transmission unit 18 and the side wall 4, and a third elastically yieldable bearing assembly 29 interposed between the assembly of the engine 17 and the transmission unit 18 and the cross member 13. Specifically, the first bearing assembly 27 is used to elastically yieldingly connect a first portion of the power plant 14 to the suspension tower 10 and the side frame member 12 on the side wall 5 at a position adjacent the partition wall 3 and rearwardly of the center of gravity G of the power plant 14 with respect to the direction of the forward run of the automobile. The second bearing assembly 28 is used to elastically yieldably connect a second portion of the power plant 14, opposite to the first portion thereof in a direction widthwise of the automobile, to the side frame member 12 on the side wall 4 at a position adjacent the partition wall 3 and rearwardly of the center of gravity G of the power plant 14. Finally, the third bearing assembly 29 is used to elastically yieldingly connect a third portion of the power plant 14 to the cross member 13 at a position frontwardly of the center of gravity G and on one side opposite to any one of the first and second bearing assemblies 27 and 28.

In addition, when viewed in a direction parallel to the direction of run of the automobile, the first and third bearing assemblies 27 and 29 are respectively positioned above and below the center of gravity G of the power plant 14 while the second bearing assembly 28 is positioned intermediately between the first and third bearing assemblies 27 and 29, as best shown in FIG. 2. More specifically, the first to third bearing assemblies 27 to 29 are so positioned that the imaginary line drawn so as to pass through the first and second points of elastically yieldable connection defined by and contained in the respective first and second bearing assemblies 27 and 28 extends generally in parallel to the natural torque axis R, as will be subsequently defined, while the third point of elastically yieldable connection defined by and contained in the third bearing assembly 29 occupies a position on one side of the center of gravity G of the power plant 14 opposite to the imaginary line. By so arranging the first to third bearing assemblies 27 to 29, and by employing the bearing assemblies 27 of identical or substantially identical construction as will be described later, the principal roll axis of elasticity of the power plant 14, as will be defined later, is rendered to extend in alignment with the natural torque axis R.

The term "principal roll axis of elasticity" herein used appears to be well understood by those skilled in the art and is intended to mean one of the three principal axes of elasticity which is the closest to the axis of rotation of the crank shaft and about which the power plant 14, i.e., the elastically yieldingly supported solid body of mass, tends to roll when a static torque is applied to the power plant. It is to be noted that when the frequency of forced vibrations of the power plant is low, that is, when the engine speed is low, the axis of vibration of the power plant 14 approaches this principal roll axis of elasticity.

The term "natural torque axis" identified by R in FIG. 2 appears, as well, to be well understood by those skilled in the art and is intended to mean the axis about which the power plant 14, that is, the rigid body, tends to rotate when a torque is applied to the power plant about the axis of the crank shaft. This natural torque axis R is determined in position by the position of both of the crank shaft and the principal roll axis of inertia. It is to be noted that the power plant 14 tends to undergo a rotary vibration about the natural torque axis R when the engine speed is high, that is, when the torque varies at a high frequency with the frequency of forced vibration of the power plant 14 being remarkedly higher than the natural frequency of vibration thereof. The term "principal roll axis of inertia" herein used is identified by X in FIG. 2 and means one of the three principal axes of inertia which is the closest to the axis of rotation of the crank shaft. As shown in FIG. 2, the principal roll axis X of inertia passes through the center of gravity G of the power plant 14 and extends at an angle $\alpha$, which may be within the range of 10 to 15 degrees in practice, relative to the imaginary horizontal line drawn in parallel to the output shaft of the differential gear unit 19 which is drivingly connected to the drive shafts 21 by means of respective universal joints. It is to be noted that the torque roll axis R as defined above passes through the center of gravity G of the power plant 14 and extends at an angle $\beta$ relative to the principal roll axis of inertia. The angles $\alpha$ and $\beta$ are well known as having the following relationship:

$$\tan \beta = I_x/I_z \tan \alpha$$

wherein $I_x$ represents the moment of inertia about the principal roll axis X of the inertia, and $I_z$ represents the moment of inertial about the principal yaw axis of inertia.

It is to be noted that reference character Y used in FIGS. 1 and 2 represents the yaw axis about which the power plant 14, especially the power plant including the three or five cylinder engine, tends to yaw. This yaw axis Y passes through the center of gravity G of the power plant 14 and extends generally at right angles to the road surface (the horizontal plane).

Hereinafter, the details of each of the first to third bearing assemblies 27 to 29 will be described with particular reference to FIG. 4. However, reference will be made only to the first bearing assembly 27 for the sake of brevity because all of the bearing assemblies 27 to 29 are of identical construction.

Figure 4:
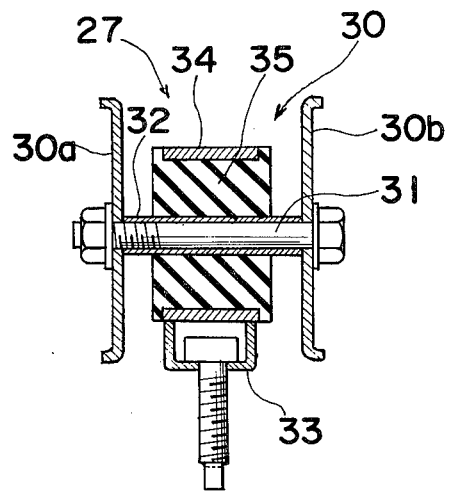
FIG. 4 is a longitudinal sectional view, on an enlarged scale, showing one of the three elastically yieldable bearing assemblies used in supporting the power plant.

Referring now to FIG. 4, the bearing assembly 27 comprises a generally U-shaped bracket 30 having a pair of arms 30a and 30b, a bolt 31 extending between the arms 30a and 30b and held in position by a nut threaded to the bolt 31, an inner sleeve 32 mounted on the bolt 31 and rigidly connected to the bracket 30 between the arms 30a and 30b, an outer sleeve 34 having a bracket 33 rigidly mounted on the outer periphery thereof and adapted to be connected to the first, second or third portion of the power plant 14, and a cylindrical elastic member 35 coaxially interposed between the inner and outer sleeve 32 and 34 and preferably made of a suitable rubber material.

While each of the first to third bearing assemblies 27 to 29 is constructed as hereinabove described with particular reference to FIG. 4, the brackets 30 of the corresponding bearing assemblies 27 to 29 are rigidly secured to the side walls 4 and 5 and the cross member 13 at such locations as hereinbefore described, respectively, whereas the brackets 33 thereof are rigidly secured to the previously mentioned first to third portions of the power plant 14, respectively. Connection of the brackets 30 to the components of the automobile front body structure 1, as well as that of the brackets 33 to the power plant 14, may be done by the use of any suitable connecting means, for example, set screws or bolts or weld deposits.

In accordance with the present invention, these first to third bearing assemblies 27 to 29 are so positioned and so arranged that the longitudinal axis of each of the inner sleeves 32 and bolts 31 can extend in a direction generally parallel to the tangential direction of the imaginary circle drawn about the yaw axis Y and also generally parallel to the road surface and that the respective longitudinal axes of the bolts 31 of the first and second bearing assemblies 27 and 28 are oriented lengthwise of the automobile whereas the longitudinal axis of the bolt 31 of the third bearing assembly 29 is oriented widthwise of the automobile. In this arrangement, when the power plant 14 in operation yaws, shear deformation takes place in the respective elastic members 35 of the first to third bearing assemblies 27 to 29 to produce a cushioning effect to the power plant 14.

From the foregoing description, it has now become clear that, with the power plant 14 so elastically yieldingly supported by the first to third bearing assemblies, the center of gravity G of the power plant 14 lies on and within the triangular plane defined by the first to third points of elastically yieldable connection which are in turn defined by and contained in the respective bearing assemblies 27 to 29. In the event that the center of gravity G of the power 14 displaces in position as a result of the subsequent addition of the air-conditioner compressor unit to the power plant 14, it only displaces a slight distance, but substantially remain in the vicinity of the triangular plane because the weight of the subsequently added compressor unit occupies a generally small proportion relative to the total weight of the power plant 14 as a whole.

The front frame 6, that is, the cross member 13, used to support the power plant 14 through the third bearing assembly 29 from below may be one of conventionally used body member and may, therefore, not be employed solely for the purpose of the present invention. In any event, since this cross member 13 is not connected directly to the partition wall 3 in contrast to both the torque rod and the sub-frames used in the prior art systems as hereinbefore discussed, the transmission of vibration of the power plant to the passenger compartment can advantageously be minimized. In addition, since nothing is employed to extend in a space adjacent to the access opening leading to the engine compartment 2, that is, since the power plant 14 is supported from the opposite lateral sides and also from front end, the access to the power plant through the access opening will by no way be hampered, thereby making the engine servicing readily and easily performable.

It is also clear that, since the imaginary line drawn between the first and second points of elastically yieldable connection extends in parallel to the natural torque axis R of the power plant 14 whereas the third point of elastically yieldable connection is located on one side of the center of gravity G of the power plant 14 opposite to such imaginary line, it is easy to make the principal roll axis of elasticity of the power plant coincide with the natural torque axis R and, therefore, the axis about which the power plant 14 rolls can advantageously be fixed. This in turn results in that the elastic members 35 of the first to third bearing assemblies 27 to 29 can deform in the same direction when shear forces are applied thereto as a result of the yawing of the power plant 14 thereby uniformly suppressing the vibration of the power plant 14. This effect of absorbed vibration can be enhanced by arranging the first to third bearing assemblies 27 to 29 in such a way as to render the axes of the inner sleeves 32, that is, the bolts 31, generally parallel to the tangential direction of the imaginary circle about and containing the yaw axis Y.

Although the present invention has been described in connection with the preferred embodiment thereof with reference to the accompanying drawings, it is to be noted that various changes and modifications are apparent to those skilled in the art. By way of example, although the brackets 30 and 33 of each of the bearing assemblies 27 to 29 have been described and shown as connected to the automobile front body structure and the power plant, they may be reversed in position.

Accordingly, such changes and modifications are to be understood as included within the true scope of the present invention unless they depart therefrom.

I claim:

1. A support system for an automobile power plant including an engine, a transmission and a differential, which comprises, in combination:

a housing structure forming a part of an automobile body structure and having an engine compartment defined therein, said engine compartment being defined by and surrounded by a partition wall, separating the engine compartment from a passenger compartment, a pair of opposite side walls generally extending outwardly from the partition wall in spaced relation to each other and at least one transverse frame member extending between the side walls in spaced relation to the partition wall, said power plant being mounted in the engine compartment with the axis of rotation of the engine oriented widthwise of the automobile body structure; and first, second and third elastically yieldable bearing assemblies each having elastically yieldable connections for connecting corresponding first, second and third different portions of the power plant to the side walls and transverse frame member, respectively, said first and second bearing assemblies being positioned on one side of the center of gravity of the power plant adjacent the partition wall, said third bearing assembly being positioned on the other side of the center of gravity of the power plant remote from the partition wall, said first and second elastically yieldable bearing assemblies defining said first and second points of elastically yieldable connections and positioned such that an imaginary line, drawn between the first and second points of elastically yieldable connections, extends on one side of and generally in parallel to the natural torque axis of the power plant.

2. A system as claimed in claim 1, wherein the housing structure is an automobile front body structure, and the transverse frame member is constituted by a front cross member being a closed cross-section and wherein the first and second bearing assemblies and the third bearing assembly are also positioned above and below the center of gravity of the power plant, said second bearing assembly being located at a intermediate level between the respective levels of the first and third bearing assemblies.

3. A system as claimed in claim 2, wherein each of the side walls includes a side frame member of generally U-shaped cross-section secured to the respective side wall to form a generally closed hollow member therein, the side frame members being connected to the front cross member at the front of the automobile body structure, and wherein the second bearing assembly connects the second portion of the power plant to the side frame member in an elastically yieldable manner.

4. A support system for an automobile power plant including an engine, a transmission and a differential, which comprises, in combination:
   a housing structure forming a part of an automobile body structure and having an engine compartment defined therein, said engine compartment being defined by and surrounded by a partition wall, separating the engine compartment from a passenger compartment, a pair of opposite side walls generally extending outwardly from the partition wall in spaced relation to each other and at least one transverse frame member extending between the side walls in spaced relation to the partition wall, said power plant being mounted in the engine compartment with the axis of rotation of the engine oriented widthwise of the automobile body structure; and
   first, second and third elastically yieldable bearing assemblies for elastically yieldingly connecting corresponding first, second and third different portions of the power plant to the side walls and transverse frame member, respectively, said first and second bearing assemblies being positioned on one side of the center of gravity of the power plant adjacent the partition wall, said third bearing assembly being positioned on the other side of the center of gravity of the power plant remote from the partition wall, wherein each of the first, second and third bearing assemblies comprises an inner sleeve connected to one of the housing structure and the power plant, an outer sleeve positioned coaxially externally of the inner sleeve and connected to the other of the housing structure and the power plant, and an elastic member interposed between the inner and outer sleeves, and wherein the first, second and third bearing assemblies are so arranged as to permit the longitudinal axis of the respective inner sleeves of the first, second and third bearing assemblies to extend generally in parallel relation to the tangential direction of an imaginary circle having a center occupied by a generally vertically extending yaw axis about which the power plant may yaw.

5. A system as claimed in claim 4, wherein the respective longitudinal axes of the inner sleeves of the first and second bearing assemblies extend in a direction generally lengthwise of the automobile body structure, and the longintudinal axis of the inner sleeve of the third bearing assembly extends generally widthwise of the automobile body structure.

6. A support system for an automobile power plant including an engine, a transmission and a differential, which comprises, in combination:
   a housing structure forming a part of an automobile body structure and having an engine compartment defined therein, said engine compartment being defined by and surrounded by a partition wall, separating the engine compartment from a passenger compartment, a pair of opposite side walls generally extending outwardly from the partition wall in spaced relation to each other and at least one transverse frame member extending between the side walls in spaced relation to the partition wall, said power plant being mounted in the engine compartment with the axis of rotation of the engine oriented widthwise of the automobile body structure; and
   first, second and third elastically yieldable bearing assemblies each having elastically yieldable connections for connecting corresponding first, second and third different portions of the power plant to the side walls and transverse frame member, respectively, said first and second bearing assemblies being positioned on one side of the center of gravity of the power plant adjacent the partition wall, said third bearing assembly being positioned on the other side of the center of gravity of the power plant remote from the partition wall, the first to third bearing assemblies being also so positioned as to permit the center of gravity of the power plant to be in close proximity to an imaginary triangular plane having its apexes occupied respectively by the first to third points of elastically yieldable connections defined by and contained in the associated first to third bearing assembles such that an imaginary line, drawn between the first and second points of elastically yieldable connections extends on one side of and generally in parallel to the natural torque axis of the power plant while the third point of elastically yieldable connection is situated on one side of the center of gravity of the power plant opposite to said imaginary line.

7. A support system for an automobile power plant including an engine, a transmission and a differential, which comprises, in combination:
   a housing structure forming a part of an automobile body structure and having an engine compartment defined therein, said engine compartment being defined by and surrounded by a partition wall, separating the engine compartment from a passenger compartment, a pair of opposite side walls generally extending outwardly from the partition wall in spaced relation to each other and at least one transverse frame member extending between the side walls in spaced relation to the partition wall, said power plant being mounted in the engine compartment with the axis of rotation of the engine oriented widthwise of the automobile body structure; and
   first, second and third elastically yieldable bearing assemblies for elastically yieldingly connecting corresponding first, second and third different portions of the power plant to the side walls and transverse frame member, respectively, said first and second bearing assemblies being positioned on one side of the center of gravity of the power plant adjacent the partition wall, said third bearing assembly being positioned on the other side of the center of gravity of the power plant remote from the partition wall, wherein said first, second and third bearing assemblies are positoned so as to permit the center of gravity of the power plant to be substantially close to an imaginary traingular plane having apexes at the first, second and third elastically yieldable connections which are defined by the first, second and third bearing assemblies.

* * * * *